United States Patent
Rue et al.

(10) Patent No.: US 10,350,688 B2
(45) Date of Patent: Jul. 16, 2019

(54) CUTTING INSERT AND A MILLING CUTTING TOOL

(71) Applicant: SANDVIK INTELLECTUAL PROPERTY AB, Sandviken (SE)

(72) Inventors: Marc Rue, Charentilly (FR); Yannick Sarton, Luynes (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 90 days.

(21) Appl. No.: 15/543,323

(22) PCT Filed: Jan. 5, 2016

(86) PCT No.: PCT/EP2016/050077
§ 371 (c)(1),
(2) Date: Jul. 13, 2017

(87) PCT Pub. No.: WO2016/113150
PCT Pub. Date: Jul. 21, 2016

(65) Prior Publication Data
US 2017/0368616 A1 Dec. 28, 2017

(30) Foreign Application Priority Data
Jan. 14, 2015 (EP) ..................................... 15151160

(51) Int. Cl.
*B23C 5/22* (2006.01)
*B23C 5/06* (2006.01)

(52) U.S. Cl.
CPC .................. *B23C 5/22* (2013.01); *B23C 5/06* (2013.01); *B23C 5/2221* (2013.01);
(Continued)

(58) Field of Classification Search
CPC .................. B23C 5/207; B23C 5/2221; B23C 2200/0455; B23C 2200/08; B23C 2200/367; B23C 2210/168
See application file for complete search history.

(56) References Cited

U.S. PATENT DOCUMENTS 7,494,303 B2 * 2/2009 Koskinen .................. B23C 5/06
407/113
7,901,161 B2 * 3/2011 Jansson ..................... B23C 5/06
407/113
(Continued)

FOREIGN PATENT DOCUMENTS

EP 2670552 A1 12/2013
EP 2367653 B1 7/2015
(Continued)

*Primary Examiner* — Willmon Fridie, Jr.
(74) *Attorney, Agent, or Firm* — Corinne R. Gorski (57) ABSTRACT

An indexable tangential cutting insert for a milling tool includes two opposing side surfaces and four identical lateral surfaces extending between the side surfaces. Each lateral surface of the insert is provided with a support surface configured to be supported by, on one hand, a corresponding support face of a pocket of a tool body providing an axial support to the insert in two of eight index positions and, on the other, a corresponding support face of the pocket providing a tangential support to the insert in two other of said eight index positions. Each lateral surface of the insert is provided with a single second support surface being concave as seen in a direction perpendicular to said side surfaces and extending diagonally across the lateral surface.

17 Claims, 5 Drawing Sheets

(52) U.S. Cl.
CPC ........... *B23B 2200/3681* (2013.01); *B23C 2200/0416* (2013.01); *B23C 2200/12* (2013.01); *B23C 2200/367* (2013.01); *B23C 2210/168* (2013.01); *B23C 2210/207* (2013.01)

(56) References Cited

U.S. PATENT DOCUMENTS

| | | | |
|---|---|---|---|
| 8,454,277 B2* | 6/2013 | Dudzinsky | B23C 5/006 407/103 |
| 8,702,353 B2* | 4/2014 | Chen | B23C 5/06 407/113 |
| 9,266,175 B2* | 2/2016 | Jaeger | B23C 5/207 |
| 9,296,054 B2* | 3/2016 | Kovac | B23B 27/1611 |
| 9,744,597 B2* | 8/2017 | Wernh | B23B 27/145 |
| 2004/0161311 A1 | 8/2004 | Satran et al. | |
| 2010/0119313 A1* | 5/2010 | Hartlohner | B23B 27/1618 407/103 |
| 2013/0108387 A1* | 5/2013 | Ishi | B23C 5/109 409/132 |
| 2013/0251464 A1* | 9/2013 | Hecht | B23C 5/06 407/48 |

FOREIGN PATENT DOCUMENTS

| | | |
|---|---|---|
| JP | H0516011 A | 1/1993 |
| JP | 2008018515 A | 1/2008 |

* cited by examiner

CUTTING INSERT AND A MILLING CUTTING TOOL

RELATED APPLICATION DATA

This application is a § 371 National Stage Application of PCT International Application No. PCT/EP2016/050077 filed Jan. 5, 2016 claiming priority of EP Application No. 15151160.7, filed Jan. 14, 2015.

TECHNICAL FIELD OF THE INVENTION

The present invention relates to an indexable tangential cutting insert for a milling tool, a milling cutting tool provided with such an insert and a tool body for such a milling cutting tool.

The invention is especially directed to cutting tools and indexable cutting inserts to be used for face milling in the form of rough milling of cast iron blocks, such as for producing engine blocks for the motor vehicle industry. Use of such a tool and insert for some shoulder milling operations may also be possible. A tangential cutting insert is oriented in an insert pocket such as during a cutting operation on a workpiece the cutting forces are directed along a major dimension of the insert making the insert able to resist high loads, but it will have a small chip breaking surface and are for that sake suitable to be used for cast iron milling resulting in short chips.

Milling tools of this type have normally a plurality of, for example six, pockets to which a cutting insert is releasably fixed for enabling indexing of the cutting insert for changing the major and minor cutting edge thereof used for the chip-removing machining in the form of milling. The present invention relates to a said cutting insert having four said major cutting edges and minor cutting edges at each side thereof and being double-sided, so that it will have totally eight different index positions. It is of vital importance for the result of the milling and the lifetime of the cutting insert and the insert pocket that the insert received in said pocket or seat of the tool body is properly supported in a fixed position therein. It is at the same time important to design such an insert and the support surfaces thereof so that no part of the insert will be damaged by the milling machining carried out degrading the result of the machining, damaging the exposed support surfaces, lateral surfaces or side surfaces of the insert, and/or requiring a premature replacement of the insert. Said support is mainly to be provided to lateral surfaces of the insert in a substantially tangential direction with respect to a rotation axis of a said cutting tool, but it has of course also to be ensured that the insert may not move in the axial direction when fixed in an insert pocket of a rotating tool body. This is taken care of by a support surface on each of the four lateral surfaces of the insert configured to be supported by on one hand a corresponding support face of a said pocket providing an axial support to the insert and on the other a support face of said pocket providing a tangential support to the insert.

BACKGROUND ART

EP 2367653 discloses a tangential cutting insert for milling of the type defined in the introduction. This insert has on each lateral surface thereof a flat support surface for providing an axial support when bearing against a flat axial support face in an insert pocket and a tangential support when bearing against a flat tangential support face in a said pocket. The result of this way of providing support to the insert in said pocket may be pointwisely transferred forces being irregularly distributed over the support surfaces of the insert resulting in mating forces deforming the support faces of the pocket and a mounting of the insert in the pocket with a reduced stability.

EP 2670552 discloses another tangential cutting insert for milling of the type defined in the introduction. This insert has two mutually inclined flat support surfaces for axial support and two mutually inclined flat support surfaces for tangential support by corresponding support faces of the tool pocket, which will reduce said mating forces and increasing said stability slightly, but the problems relating thereto are still not satisfyingly solved.

SUMMARY OF THE INVENTION

The object of the present invention is to provide a tangential cutting insert, a milling cutting tool and a tool body of the type defined in the introduction being improved in at least some aspect with respect to such cutting inserts, milling cutting tools and tool bodies already known.

This object is with respect to the cutting insert obtained by providing such a cutting insert with the features listed in the characterizing part of appended claim 1.

By having each lateral surface of the insert provided with a single second support surface being concave as seen in a direction perpendicular to the side surfaces of the insert and extending diagonally across the lateral surface for providing axial support and tangential support to the insert by corresponding second and third support faces of a tool pocket a considerably better distribution of pressure transferred from the insert to the pocket faces and emanating from the cutting forces will result than for flat such support surfaces and support faces. This results in a mounting of the insert in the pocket with an increased stability. The improved said pressure distribution also results in less mating forces deforming said support faces of a said pocket also having a positive influence upon the stability of the mounting of the insert in a said pocket and the life span of a tool body of a corresponding milling tool. The diagonal extension of said second support surface may be used to further stabilise the insert in a said pocket and apply support to the insert on favourable locations. The diagonal extension will also protect the second support surface by distancing at least half of the second support surface from the active major/minor cutting edge so that chips cut by the major/minor cutting edge will not tend to slide and wear on the second support surface.

According to an embodiment of the invention each said second support surface is formed by two substantially identical portions providing said diagonal extension of the second support surface by each having an outer border close to a different of said side surfaces and a different of the two lateral surfaces adjacent to the lateral surface to which the second support surface belongs.

According to another embodiment of the invention each second support surface is configured to bear against a said third support face by the one of said portions located most distant to the one of said side surfaces having said first support surface supported by a said first support face of the pocket in said index positions of the insert in which this second support surface is supported by a said third support face of a said pocket. This way of raising the tangential support to the insert with respect to the base of a tool pocket results in a support provided directly opposite to an active major cutting edge of the insert, so that the insert may efficiently withstand strong cutting forces without risk of destabilisation or damaging thereof.

According to another embodiment of the invention a different of said two portions is configured to be supported by a said second and third support face of a said tool body depending upon which of said side surfaces has said first support surface thereof supported by a said first support face of a pocket of a tool body. This makes it possible to assign a said portion of each second support surface on the insert to one of the two sides of the insert for ensuring that the axial and tangential support provided to the insert will be an optimum irrespectively of which side surface of the insert is applied on the first support face of a tool body pocket.

According to another embodiment of the invention said portion configured to be supported by a second support face of a said pocket in an index position is a portion of said second support surface on a said lateral face being a different of said two portions than the portion of said second support surface on an adjacent lateral surface to be supported by a said third support face of said pocket in this index position. An increased stability of the mounting of a said insert in a tool body pocket may by that be achieved.

According to another embodiment of the invention said portions of said second support surfaces of said adjacent lateral surfaces are the portions of these two second support surfaces most distant to the intersection of these two lateral surfaces. This results in a large distance between the contacts made by these two second support surfaces to support faces for axial support and tangential support in a tool body pocket increasing the stability of the mounting of the insert in such a pocket.

According to another embodiment of the invention each said portion of each said second support surface extend in a direction parallel or substantially parallel to said side surface over a restricted part of the extension of the corresponding major edge, and according to a further development of this embodiment each said portion of each said second support surface is displaced towards an end of the associated major edge opposite to said corner cutting edge of that major edge. This means that the two portions of the second support surface belonging to the same lateral surface of the insert will be displaced with respect to each other improving the possibility to enlarging the contact surface and distance between the contacts made by said portions to second and third support faces in a said pocket for axial and tangential support thereby. It also means that one of the portions will be distanced from the active major/minor cutting edge and protected from wear at the most common cutting depths (i.e. at cutting depths along the first half of the major cutting edge).

According to another embodiment of the invention a rake surface located outside said second support surface is arranged on each lateral surface next to and behind the major cutting edge of this lateral surface as seen in a direction perpendicular to said side surfaces and this rake surface is configured to act as a chip breaker. By the fact that the rake surface is dedicated to function as a chip breaker and not participating in any supporting interaction with a tool pocket the wear of the second support surfaces of the insert will be minimized during the milling operation and the life time of the insert prolonged. The rake surface can for instance be recessed relative to the second support surface and thereby function as a chip breaker. The rake surface may comprise a chip breaking surface in the form of a concavely ascending surface next to the second support surface in order to deflect the chips from the second support surface.

According to another embodiment of the invention said second support surfaces extend along a circular arc as seen in a direction perpendicular to said side surfaces. Such an extension of the second support surfaces and then also corresponding extension of said second and third support faces in a said insert pocket will result in an excellent pressure distribution of cutting forces on said faces and stability of the mounting of the insert in a said pocket. Thus, each second support surface will then extend along and outside a said arc and for interacting with support faces in a pocket extending along and inside the arc.

According to another embodiment of the invention said first support surfaces are flat.

According to another embodiment of the invention said major cutting edges extend along a concave side of a curve or along a circular arc as seen in a direction perpendicular to said side surfaces. Such a geometry of the major cutting edge enables generation of roughing chips without a lot of cutting forces.

According to another embodiment of the invention each said rake surface extends along and has a corresponding curvature as the associated major cutting edge. Such a curved chip breaker provided by the rake surface will positively influence the chip cutting performance and breaking action of the rake surface.

According to another embodiment of the invention the insert is formed by two identical halves defined by an imaginary separation plane and said two halves are twisted with respect to each other by at least 2° in a direction for obtaining a clearance behind a minor cutting edge connecting to an active major cutting edge directed substantially tangentially when the insert is received in a said pocket. By twisting the two halves it may be ensured that parts of the insert half having the side surface attached to a radial base of an insert pocket may not risk to hit a workpiece machined by an active major cutting edge, a corner edge and minor cutting edge belonging to the other insert half.

The object of the present invention is with respect to the milling cutting tool obtained by providing such a tool with at least one cutting insert according to the present invention and the further features of the independent claim directed to a milling cutting tool. The advantages of such a milling cutting tool appear clearly from the above discussion of a cutting insert according to the invention and the embodiments thereof.

According an embodiment of the invention said insert pocket is configured to receive a said insert having a central axial through-hole for securing it in the pocket by a screw, and the base of the pocket has a threaded bore for receiving a said screw located slightly offset with respect to said through-hole of the insert enabling said screw to urge second support surfaces of the insert to bear under pretension against said second and third support faces of the pocket when the screw is tightened and the first support surface of the insert is pressed against said base of the pocket. This offset ensures that the support surfaces of the insert will really be supported by support faces of the insert pocket when the insert is fixed in said pocket.

The object of the present invention is with respect to the tool body for a milling cutting tool obtained by providing such a tool body with the features of the independent claim directed to such a tool body. The advantages of such a tool body and embodiments thereof appear from the above discussion of a milling cutting tool according to the invention and the embodiments thereof.

Other advantageous features as well as advantages of the present invention appear from the description following below.

BRIEF DESCRIPTION OF THE DRAWINGS

With reference to the appended drawings, below follows a specific description of an embodiment of the invention cited as an example.

In the drawings.

DETAILED DESCRIPTION OF AN EMBODIMENT OF THE INVENTION

Figure 1:
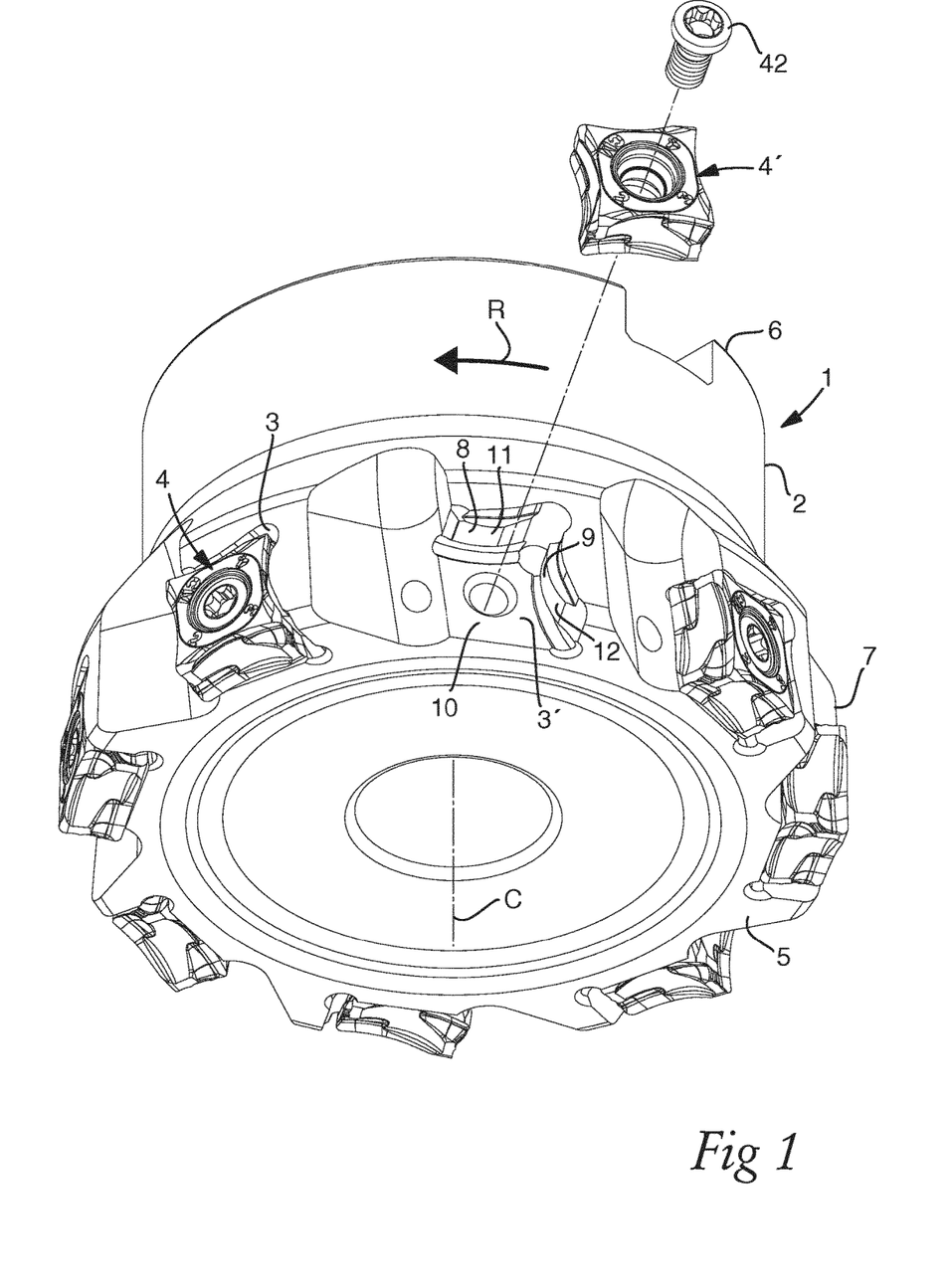
FIG. 1 shows a perspective view of a milling tool provided with cutting inserts according to an embodiment of the invention with one insert lifted out of the pocket therefor in the tool body.

A milling cutting tool 1 for face milling according to an embodiment of the invention is shown in FIG. 1. The tool has a tool body 2 having totally eight seats or pockets 3 for each receiving a cutting insert 4 according to the invention releasably fixed to the pocket. One cutting insert 4' is removed from the pocket 3' for illustrating the structure of the pocket. The tool body 2 includes a front end 5 and a rear end 6 between which a central rotation axis C extends around which the tool is rotatable in a direction of rotation R. The pockets 3 are formed in a transition between the front end and an envelope surface 7 extending between the front end 5 and the rear end 6 of the tool body.

The insert pocket 3 comprises adjacent side 8 and rear 9 walls generally transverse to a flat base 10 configured to form a first support face for providing radial support to an insert 4 received in said pocket. The side wall is provided with a second support face 11 extending along a convex side of a curve and configured to form an axial support to an insert received in the pocket, and the rear wall is provided with a third support face 12 also extending along a convex side of a curve and configured to form a tangential support to an insert received in the pocket.

An indexable double-sided tangential cutting insert 4 for milling according to an embodiment of the invention will now be described while making reference simultaneously to FIGS. 2-5. The cutting insert may typically be made of cemented carbide comprising wear resistant coatings, accordingly being considerably harder than the tool body normally made of steel. The cutting insert comprises two opposing side surfaces 13 and 14 in parallel with each other and a peripheral surface 15 extending between said side surfaces and formed by four identical lateral surfaces 16-19.

Figure 2:
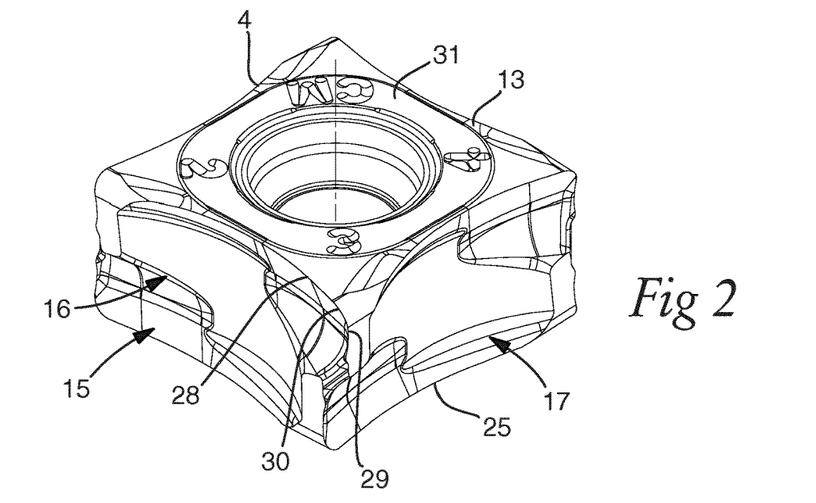
FIG. 2 shows an enlarged perspective view of a cutting insert according to said embodiment of the invention.
Figure 4:
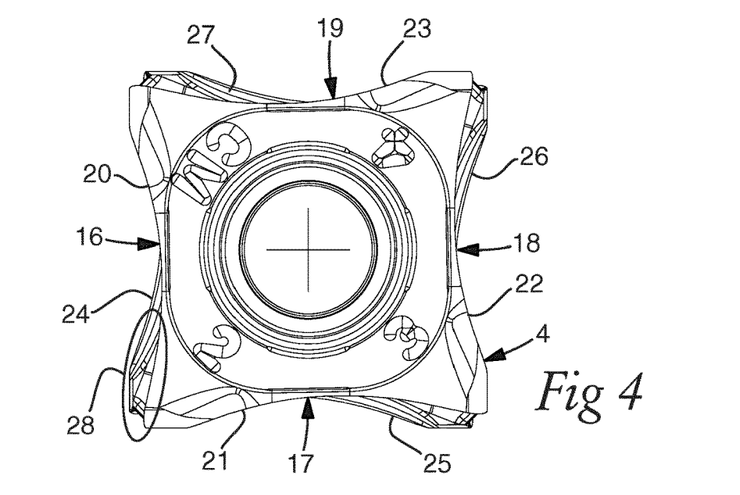
FIG. 4 shows the cutting insert of FIG. 2 viewed perpendicularly to the side surfaces thereof.
Figure 5:
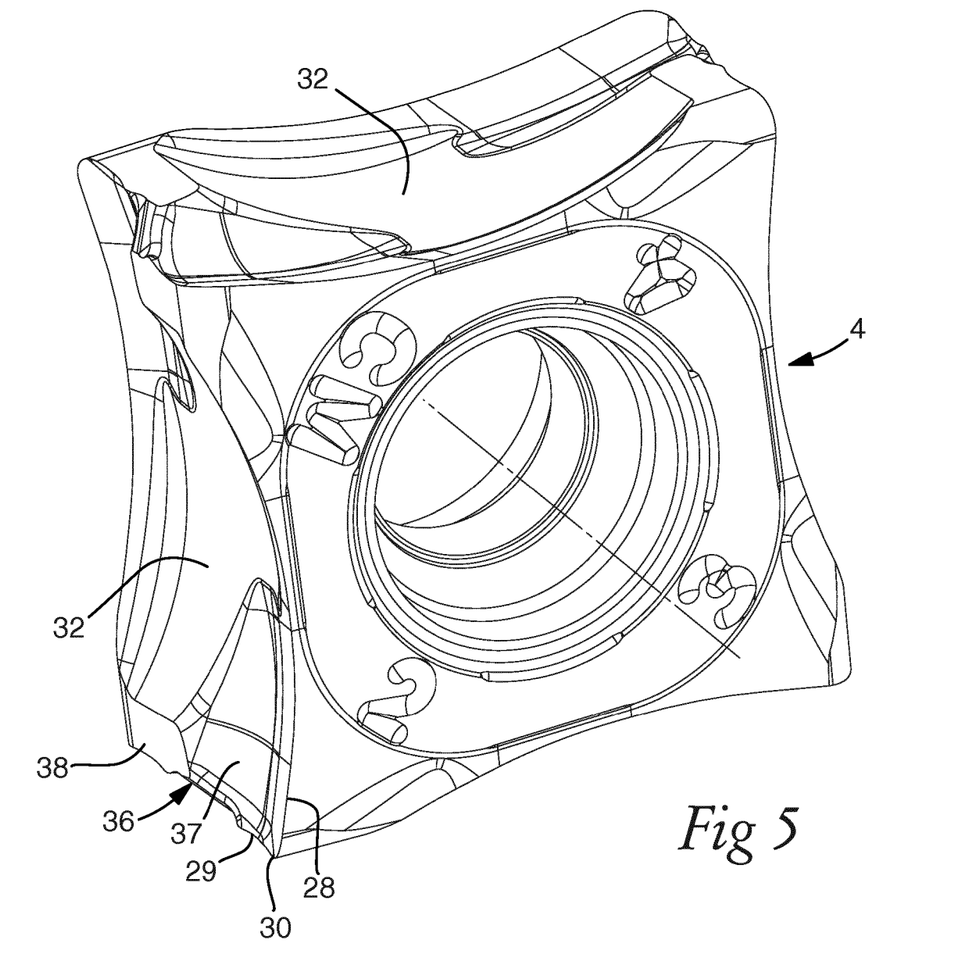
FIG. 5 shows a perspective view of the insert of FIG. 2.

A major edge 20-27 is formed at each intersection of a lateral surface and a side surface and connects opposing said lateral surfaces and having a major cutting edge 28 extending over a part of the major edge as indicated in FIG. 4. A minor cutting edge 29 connects to each major cutting edge by a corner cutting edge 30 at an intersection of adjacent lateral surfaces as indicated in FIGS. 2 and 5.

Each side surface of the insert is provided with a flat first support surface 31 configured to be supported by a first support face formed by said base 10 of a pocket of the tool body providing a radial support to the insert. Furthermore, each lateral surface of the insert is provided with a second support surface 32 configured to be supported by on one hand a said second support face 11 of said pocket providing and axial support to the insert and on the other a said third support face 12 of the pocket providing a tangential support to the insert. Thus, a said second support surface 32 will in two of the eight possible index positions of the insert in the pocket bear against a said second support face in the pocket and in two other of said eight possible index positions bear against a said third support face 13 of the insert.

Each second support surface 32 of the insert has a shape corresponding to that of said second and third support face in the pocket, which means that it is concave as seen in a direction perpendicular to the side surfaces 13, 14 of the insert. Each second support surface 32 is formed by two identical portions 33, 34 which are displaced with respect to each other in a direction parallel to the side surfaces and substantially parallel to the major edges of the respective lateral surface and extend along and closed to opposite major edges (25 and 26 in FIG. 3) of the respective lateral surface of the insert. Each of the two portions 33, 34 extend over a restricted part of the extension of the corresponding major edge and is displaced towards an end of the associated major edge opposite to the corner edge 30 of that major edge. This results in a diagonal extension of the second support surface 32 formed by the two portions 33, 34 across the lateral surface.

Figure 3:
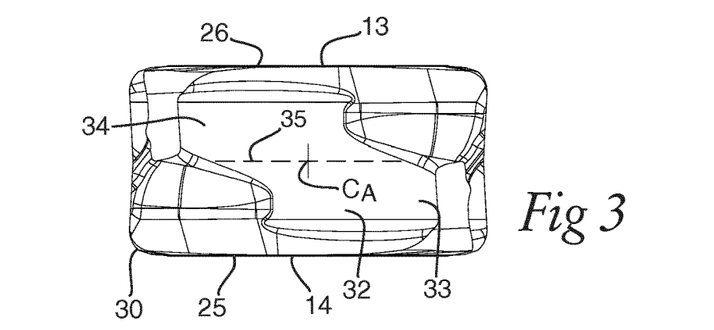
FIG. 3 shows the insert of FIG. 2 in a side elevation on a lateral surface thereof.

It appears from the figures that the insert 4 according to this embodiment of the invention is formed by two identical halves defined by an imaginary separation plane in parallel with said side surfaces 13, 14 and having identical extensions in opposite directions from the separation plane 35, which means that if one of the halves is turned by 180° with respect to a centre axis $C_A$ of the second support surface 32 extending perpendicularly to a centre of the support surface 32 as shown in FIG. 3 it will correspond to the other half. The two halves are twisted with respect to each other as appears from FIG. 4 by at least 2° in a direction for obtaining a clearance 36 behind a minor cutting edge 29 connecting to an active major cutting edge 28 directed substantially tangentially when the insert is received in a said pocket, as shown in FIG. 5.

By the fact that each said portion of each second support surface 32 is displaced towards an end of the associated major edge opposite to said corner edge 30 of that major edge a significant rake surface 37 will be formed behind an active major cutting edge 28 as seen in FIG. 5. This rake surface does not participate in any insert supporting action but is solely there for chip breaking, so that such chip breaking will not negatively influence the condition of any support surface of the insert. The rake surface is recessed relative to the second support surface 32 and will thereby improve the chip breaking property thereof. The curvature of the rake surface will also improve the chip breaking property thereof. In particular a further ascending concave chip breaking surface will be formed next to the second support surface by an end part 38 of that lateral surface located next to the side surface bearing on the base of the insert pocket. It is by that avoided that chips will interfere with the contact surface of the active edges of the insert with the workpiece machined and destroy this surface.

Figure 7:
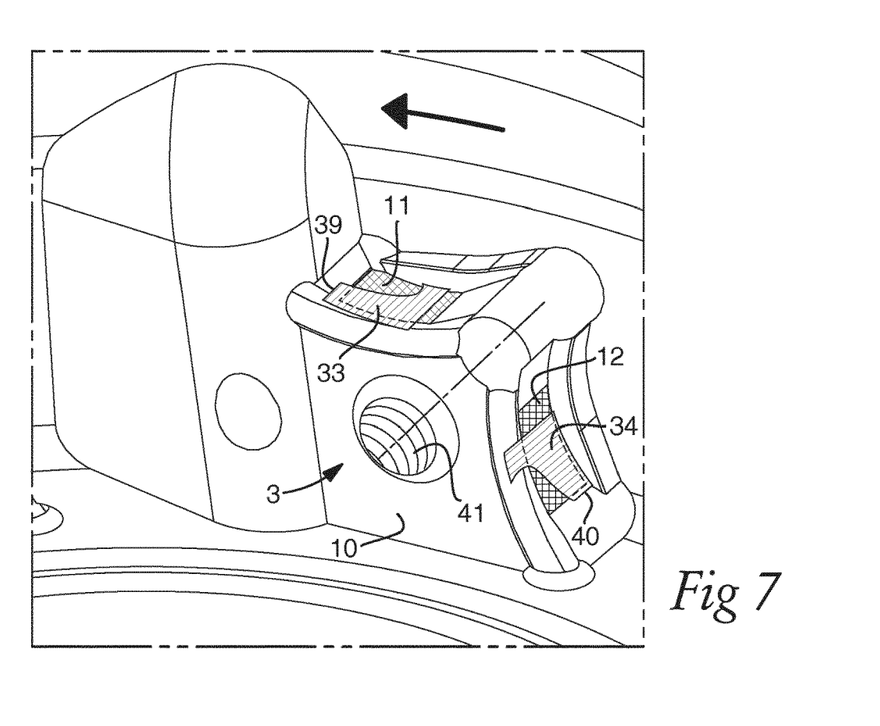

It is indicated in FIG. 7 how the second 11 and 12 support faces in the insert pocket are designed to interact with the respective said second support surface on an insert received in said pocket. It can be seen that a different of said two portions 33, 34 of a second support surface of the insert will be supported by a support face in the pocket depending upon whether the lateral surface in question of the insert will be directed for an axial or tangential support of the insert. It is by that achieved that the portions 33, 34 of a said second support surface of adjacent lateral surfaces supported by the axial support face and the tangential support face of the insert pocket are the portions of these two second support surfaces most distant to the intersection of the two lateral surfaces. This means that the distance between these positions for providing axial and tangential support will be great, and it will be even greater by the fact that it is a "lower" portion 33 located closer to the base 10 of the insert pocket that forms the axial support and the "upper" portion 34 that forms the tangential support resulting in a great diagonal distance of the outer borders 39, 40 of these supports. Thus, said distance will be near the diagonal insert dimension value. By having said "upper" portion 34 forming the tangential support this will also be located directly opposite to the position on the active major cutting edge where the cutting forces are the greatest.

Figure 6:
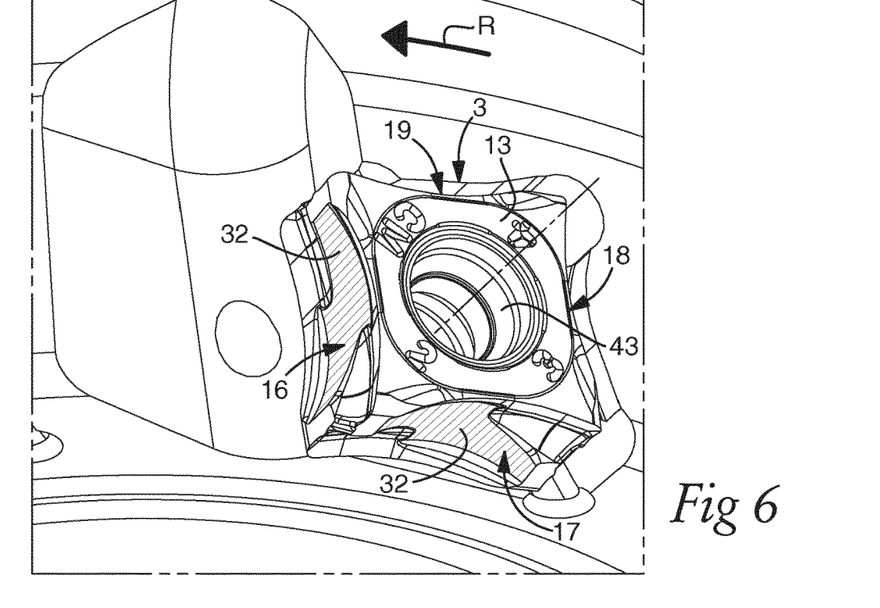
FIG. 6 shows the insert of FIG. 2 received in a pocket of a milling tool shown in FIG. 1, FIG. 7 corresponds to FIG. 6, but the insert is removed from the pocket of the tool body.
Figure 8:
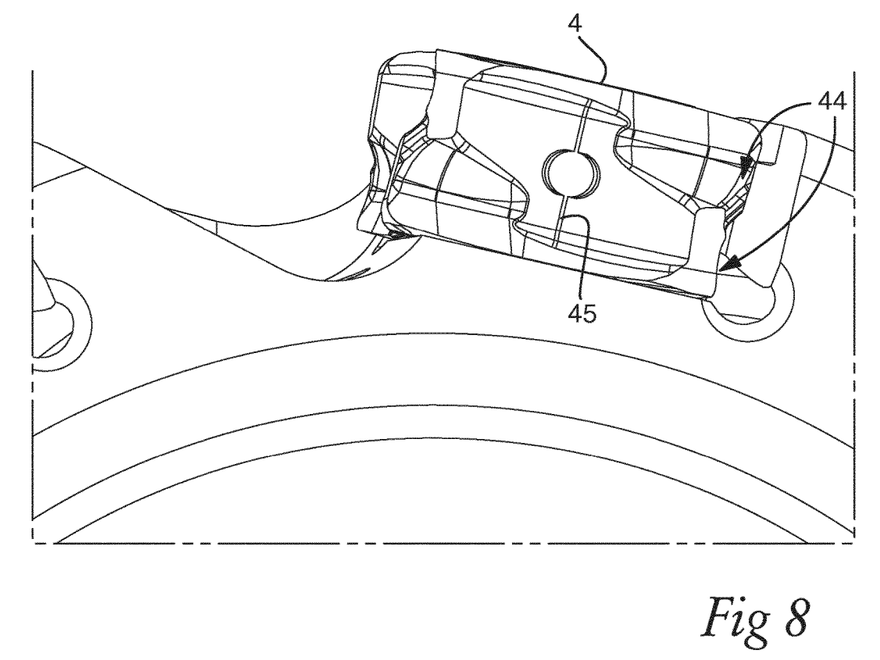
FIG. 8 shows the insert and pocket receiving the insert as viewed in the direction of the arrow VIII in FIG. 6.

FIG. 6 and FIG. 8 shows more in detail how an insert 4 is fixed in a pocket 3 of the tool body. The base 10 of the pocket 3 has for that sake a threaded bore 41 for receiving a screw 42 located slightly offset with respect to a through-hole 43 of the insert 4 enabling the screw 42 to urge the portions 33, 34 of the second support surfaces of two lateral surfaces 18, 19 of the insert to bear under pretension against the support faces 11, 12 of the pocket when the screw is tightened and the flat first support surface on a side surface of the insert is pressed against the base 10 of the pocket 3.

It appears especially from FIG. 8 that the cutting edges are never in contact with any portions of the pocket as illustrated by the arrows 44 indicating spaces provided between the cutting edges and the insert. These spaces and clearances obtained by the design of the pocket with respect to an insert received therein except for at the places where the support surface portions 33 and 34 bear against support faces of the pocket make it possible to tighten said screw 42 and obtaining the fit of the insert under pretension in the pocket while protecting cutting edges of the insert and the pocket against negative mating forces. The fact that said two insert halves are mutually twisted also contributes to efficiently keep the main cutting edge at a distance to pocket walls.

The invention is of course not in any way restricted to the embodiments thereof described above, but many possibilities to modifications thereof would be apparent to a person with skill in the art without departing from the scope of the invention as defined in the appended claims.

It is emphasized that concave means that the support surface in question extend while being continuously bent in the same sense, but the radius of curvature along said extension may vary. Thus, an extension along a circular arc is one possible and also advantageous way of realising a concave extension as seen in a direction perpendicular to the side surfaces of the insert. The corresponding reasoning applies to a convex extension as for the support faces of the insert pocket.

"A single said second support surface being concave" as used inter alia in claim 1 of this disclosure is to be interpreted to also cover "substantially single" in the sense that a major concave surface forming said second support surface is formed by two or more concave surface portions joined together and possibly separated by a minor gap or flat portion with an insignificant width. The width of the minor gap or flat portion may vary depending on the size of the tangential insert, yet an insignificant width in this context means fractions of a millimeter (e.g. less than 0.5 mm and typically such width can be in the range 0.1-0.2 mm). It is illustrated in FIG. 8 how the second support surface may be provided with such a flat portion 45.

The invention claimed is:

1. An indexable tangential cutting insert for a milling tool comprising:
    two opposing side surfaces and a peripheral surface extending between said side surfaces and formed by four identical lateral surfaces;
    a major edge at each intersection of a lateral surface and a side surface connecting opposing said lateral surfaces and having a major cutting edge extending over at least a part of the major edge;
    a minor cutting edge connected to each major cutting edge by a corner cutting edge at an intersection of adjacent lateral surfaces, each said side surface being provided with a first support surface configured to be supported by a first support face of a pocket of a tool body of said tool providing a radial support to the insert and each said lateral surface being provided with a second support surface configured to be supported by a corresponding second support face of said pocket providing an axial support to the insert in two of eight index positions of the insert and by a corresponding third support face of said pocket providing a tangential support to the insert in two other of said eight index positions, wherein each lateral surface is provided with a single said second support surface being concave as seen in a direction perpendicular to said side surfaces and extending diagonally across the lateral surface.

2. The cutting insert according to claim 1, wherein each said second support surface is formed by two substantially identical portions providing said diagonal extension of the second support surface by each having an outer border close to a different of said side surfaces and a different of the two lateral surfaces adjacent to the lateral surface to which the second support surface belongs.

3. The cutting insert according to claim 2, wherein each second support surface is configured to bear against said third support face by the one of said portions located most distant to the one of said side surfaces having said first support surface supported by said first support face of the pocket in said index positions of the insert in which this second support surface is supported by said third support face of said pocket.

4. The cutting insert according to claim 2, wherein a different of said two portions is configured to be supported by a said second and third support face of said tool body depending upon which of said side surfaces has said first support surface thereof supported by said first support face of the pocket of the tool body.

5. The cutting insert according to claim 2, wherein said portion configured to be supported by the second support face of said pocket in an index position is a portion of said second support surface on said lateral surface being a different of said two portions than the portion of said second support surface on an adjacent lateral surface to be supported by said third support face of said pocket in the index position.

6. The cutting insert according to claim 5, wherein said portions of said second support surfaces of said adjacent lateral surfaces are the portions of these two second support surfaces most distant to the intersection of these two lateral surfaces.

7. The cutting insert according to claim 2, wherein each said portion of each said second support surface extends in a direction parallel or substantially parallel to said side surface over a restricted part of the extension of a corresponding major edge.

8. The cutting insert according to claim 7, wherein each said portion of each said second support surface is displaced towards an end of an associated major edge opposite to said corner cutting edge of that major edge.

9. The cutting insert according to claim 8, wherein a rake surface located outside said second support surface is arranged on each lateral surface next to and behind the major cutting edge of this lateral surface as seen in a direction perpendicular to said side surfaces, the rake surface being configured as a chip breaker.

10. The cutting insert according to claim 1, wherein said second support surfaces extend along a circular arc as seen in a direction perpendicular to said side surfaces.

11. The cutting insert according to claim 1, wherein said first support surfaces are flat.

12. The cutting insert according to claim 1, wherein said major cutting edges extend along a concave side of a curve or along a circular arc as seen in a direction perpendicular to said side surfaces.

13. The cutting insert according to claim 9, wherein each said rake surface extends along and has a corresponding curvature as the associated major cutting edge.

14. The cutting insert according to claim 1, wherein the insert is formed by two identical halves defined by an imaginary separation plane in parallel with said side surfaces and having identical extensions in opposite directions from said separation plane, and that said two halves are twisted with respect to each other by at least 2° in a direction for obtaining a clearance behind a minor cutting edge connecting to an active major cutting edge directed substantially tangentially when the insert is received in a said pocket.

15. A milling cutting tool comprising:
at least one cutting insert including two opposing side surfaces and a peripheral surface extending between said side surfaces and formed by four identical lateral surfaces, a major edge at each intersection of a lateral surface and a side surface connecting opposing said lateral surfaces and having a major cutting edge extending over at least a part of the major edge, and a minor cutting edge connected to each major cutting edge by a corner cutting edge at an intersection of adjacent lateral surfaces;
a tool body including a front end, a rear end, between which a central rotation axis extends around which the tool is rotatable in a direction of rotation, and at least one insert pocket formed in a transition between the front end and an envelope surface extending between the front end and the rear end of the tool body, wherein said insert pocket includes adjacent side and rear walls generally transverse to a base, each said side surface of the cutting insert being provided with a first support surface configured to be supported by a first support face of the at least one pocket of the tool body providing a radial support to the insert and each lateral surface being provided with a second support surface configured to be supported by a corresponding second support face of the pocket providing an axial support to the insert in two of eight index positions of the insert and by a corresponding third support face of the pocket providing a tangential support to the insert in two other of eight index positions, wherein each lateral surface is provided with a single second support surface being concave as seen in a direction perpendicular to the side surfaces and extending diagonally across the lateral surface; and
a fastening device configured to secure said insert in said pocket while pressing two said second support surfaces of the insert against said second and third support face of the pocket.

16. The cutting tool according to claim 15, wherein said base is generally flat and configured to form said first support face to a generally flat first support surface on the insert.

17. The cutting tool according to claim 15, wherein said insert pocket is configured to receive said insert having a central through-hole for securing it in the pocket by the fastening device, the base of the pocket having a threaded bore for receiving the fastening device located slightly offset with respect to said through-hole of the insert enabling said fastening device to urge second support surfaces of the insert to bear under pretension against said second and third support faces of the pocket when the screw is tightened and the first support surface of the insert is pressed against said base of the pocket.

* * * * *